(12) United States Patent
Ravikumar et al.

(10) Patent No.: US 10,597,014 B2
(45) Date of Patent: Mar. 24, 2020

(54) BRAKE BOOSTER FOR A VEHICLE

(71) Applicants: Hyundai Motor Company, Seoul (KR); Kia Motors Corporation, Seoul (KR)

(72) Inventors: D. J. Ravikumar, Hyderabad (IN); Young Suk Jung, Seoul (KR); P. V. Raghava, Hyderabad (IN)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 120 days.

(21) Appl. No.: 15/891,531

(22) Filed: Feb. 8, 2018

(65) Prior Publication Data

US 2019/0168726 A1 Jun. 6, 2019

(30) Foreign Application Priority Data

Dec. 5, 2017 (IN) .............................. 201711043520

(51) Int. Cl.
*B60T 13/44* (2006.01)
*B60T 8/48* (2006.01)
*B60T 13/57* (2006.01)

(52) U.S. Cl.
CPC ............ *B60T 13/44* (2013.01); *B60T 8/4854* (2013.01); *B60T 13/57* (2013.01)

(58) Field of Classification Search
CPC .......... B60T 13/44; B60T 13/57; B60T 17/02; B60T 13/52
See application file for complete search history.

(56) References Cited

U.S. PATENT DOCUMENTS

| | | | |
|---|---|---|---|
| 9,568,094 B2* | 2/2017 | Miyaishi | F16H 59/78 |
| 2012/0096849 A1* | 4/2012 | Cunningham | B60T 17/02 60/547.1 |
| 2014/0102843 A1* | 4/2014 | Tanizawa | B60T 13/57 188/356 |

* cited by examiner

*Primary Examiner* — Abiy Teka
(74) *Attorney, Agent, or Firm* — Mintz Levin Cohn Ferris Glovsky and Popeo, P.C.; Peter F. Corless

(57) ABSTRACT

A brake booster for a vehicle is provided. The booster includes a casing formed by a combination of a front and rear shell. A diaphragm divides the casing into a constant and a variable pressure room. A circumference of a front side end seals a valve body combined with the diaphragm and a rear portion penetrates the rear shell. A high pressure air passage selectively provides high pressure air from the rear portion to the variable pressure room and a bypass passage selectively provides atmospheric air to the variable pressure room. A check valve provides high pressure air passed a turbo charger and an intercooler to the variable pressure room through the high pressure air passage. An input rod advances and retreats through an air valve of the valve body. An output rod delivers force based on displacement of the air valve and the diaphragm to a master cylinder.

8 Claims, 10 Drawing Sheets

BRAKE BOOSTER FOR A VEHICLE

CROSS-REFERENCE TO RELATED APPLICATION

This application claims priority to and the benefit of Indian Patent Application No. 201711043520 filed in the Indian Property Office on Dec. 5, 2017, the entire contents of which are incorporated herein by reference.

BACKGROUND

(a) Field of the Invention

The present invention relates to a brake booster for a vehicle, and more particularly, to a brake booster for a vehicle which reduces number of components and simplifies structure to reduce production cost.

(b) Description of the Related Art

A brake for a vehicle is classified into a foot brake which a driver operates while driving the vehicle, and a parking brake which the driver operates when parking the vehicle. Since foot brake (e.g., brake pedal) is operated while the vehicle is being driven, rapid and accurate control is required with minimal force. Accordingly, a hydraulic pressure type brake which is controlled by comparatively less pedal force as the foot brake (hereinafter, it is called as 'brake') has been developed.

The hydraulic pressure type brake has limitation in increasing braking force due to a structural characteristic and therefore includes a brake booster which is a boosting force device. The brake booster is a device which obtains a substantial amount of braking force by minimal force using a difference between vacuum pressure by intake of an engine and atmospheric pressure. The brake booster generates greater braking force than weight applied when the driver engages a brake pedal, and thus, a vehicle (heavy vehicle) traveling at a high speed is capable of braking by requiring minimal pedal force.

FIG. 1 is a schematic cross-sectional view of a conventional brake booster for a vehicle according to the prior art. As shown in FIG. 1, the conventional brake booster 11 is connected with a master cylinder 14 by pistons 12a and 12b and a push rod 13 to generate operating force of the booster 11 using a difference between atmospheric pressure and vacuum pressure. A technology that installs an additional vacuum pump to a turbo charger for compensating the conventional technology exists, but there are problems that weight of the vehicle increases and additional cost is generated by adding separate devices such as a vacuum pump, a hose, a return spring etc.

The above information disclosed in this section is merely for enhancement of understanding of the background of the invention and therefore it may contain information that does not form the prior art that is already known in this country to a person of ordinary skill in the art.

SUMMARY

The present invention provides a brake booster having a simplified structure using a difference between high pressure of compressed air passed through a turbo charger and an intercooler of a vehicle and atmospheric pressure.

A brake booster for a vehicle according to an exemplary embodiment of the present invention may include a casing formed by combination of a front shell and a rear shell, a diaphragm that divides an interior portion of the casing into a constant pressure room and a variable pressure room, a valve body sealed by a circumference of a front side end and combined with a center portion of the diaphragm and a rear portion penetrates the rear shell, and including a high pressure air passage that selectively provides high pressure air from the rear portion to the variable pressure room and a bypass passage that selectively provides atmospheric air to the variable pressure room. Additionally a check valve may be connected with the high pressure air passage to provide high pressure air passed a turbo charger and an intercooler to the variable pressure room through the high pressure air passage, an input rod of which a front side end may be disposed to move to advance and retreat through an air valve disposed at a center portion of the valve body and a rear side end may be connected with a brake pedal, an output rod may be connected with a center portion of a front end portion of the valve body by interposing a reaction disk, and delivering force according to displacement of the air valve and the diaphragm to a master cylinder, and an elastic member interposed between the front shell and the diaphragm to provide elastic force to the diaphragm.

The high pressure air passage may be formed to connect communication between the check valve and the variable pressure room. The high pressure air passage may be opened or closed by the air valve based on movement of advancing and retreating of the input rod. The high pressure air passage may provide communication between the check valve and the variable pressure room when a brake operates, and high pressure air that flows in from the check valve may be supplied to the variable pressure room.

The high pressure air passage may provide communication between the check valve and the variable pressure room since the input rod and the air valve move toward the front shell when the brake operates. The bypass passage may be formed to provide communication between atmosphere and the variable pressure room. The bypass passage may be opened or closed by the air valve based on movement of advancing and retreating of the input rod.

Further, the bypass passage may provide communication between the variable pressure room and the atmosphere when the brake is released, and high pressure air in the variable pressure room may be released to the atmosphere. The bypass passage may provide communication between the atmosphere and the variable pressure room since the input rod and the air valve move toward the brake pedal when the brake is released.

Additionally, a spring retainer may be provided to an interior circumference of a rear side of the valve body at a front side end of the input rod, and a return spring may be disposed between the spring retainer and a protrusion formed at an exterior circumference of a front side end of the input rod to provide elastic force pushing the input rod toward the brake pedal. When the brake is released, the air valve may close the high pressure air passage and open the bypass passage since the return spring pushes the input rod toward the brake pedal.

Meanwhile, an operating system of a brake booster for a vehicle according to an exemplary embodiment of the present invention may include an engine configured to generate mechanical power by combusting fuel, a turbo charger disposed at the engine and configured to convert air that flows from atmosphere to high temperature and high pressure air, an intercooler configured to cool the high temperature air supplied from the turbo charger to convert low temperature and high pressure air, and a brake booster configured to amplify braking force of the brake using the low temperature and high pressure air supplied from the intercooler. A portion (e.g., a first portion) of the air supplied from the intercooler may be supplied to the brake booster, and another portion (e.g., a second portion) of the air may be supplied to an intake manifold of the engine.

According to an exemplary embodiment of the present invention, separate devices as a conventional vacuum pump and a hose etc. for forming vacuum may be omitted to simplify the interior structure of the brake booster. Accordingly, increased productivity may be realized when manufacturing the brake booster and manufacturing costs may be reduced. In addition, weight of the vehicle may be reduced by the simplified structure using the difference between high pressure of compressed air passed through a turbo charger and an intercooler of a vehicle and atmospheric pressure.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DESCRIPTION OF SYMBOLS

Figure 1:
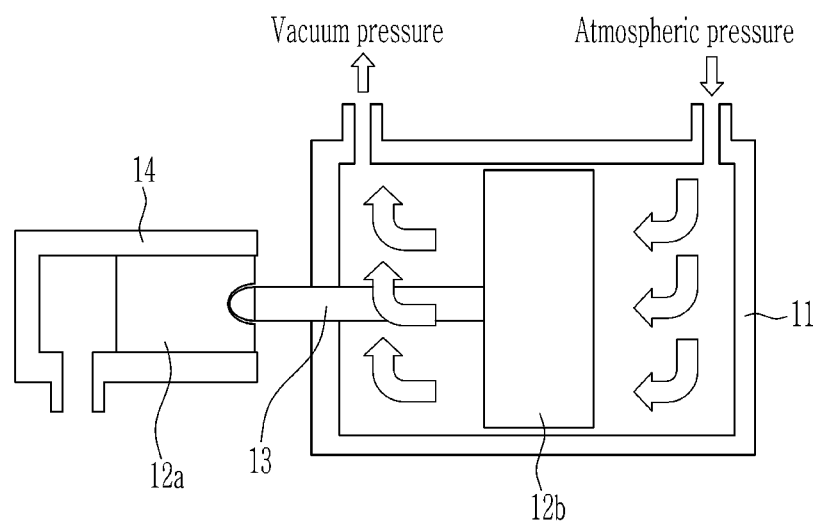
FIG. 1 is a schematic cross-sectional view of a conventional brake booster for a vehicle according to the prior art.

500: operating system of a brake booster
100: brake booster
110: casing
120: check valve
130: valve body
132: high pressure air passage
134: bypass passage
140: input rod
150: diaphragm
160: reaction disk
170: output rod
180: spring retainer
190: air valve
195: elastic member
197: return spring

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, only exemplary embodiments of the present invention have been shown and described, simply by way of illustration. As those skilled in the art would realize, the described exemplary embodiments may be modified in various different ways, all without departing from the spirit or scope of the present invention. Further, in the exemplary embodiments, since like reference numerals designate like elements having the same configuration, a first exemplary embodiment is representatively described, and in other exemplary embodiments, only a configuration different from the first exemplary embodiment will be described.

It shall be noted that the drawings are schematic and do not depict exact dimensions. The relative proportions and ratios of elements in the drawings may be exaggerated or diminished in size for the sake of clarity and convenience in the drawings, and such arbitrary proportions are only illustrative and not limiting in any way. Like reference numerals are used for like structures, elements, or parts shown in two or more drawings to show similar characteristics. When one part is said to be "over" or "on" another part, the one part may be directly over the other part or may be accompanied by another part interposed therebetween. Accordingly, the exemplary embodiments are not limited to certain forms of the regions illustrated, but may include forms that are modified through manufacturing, for example.

Figure 2:
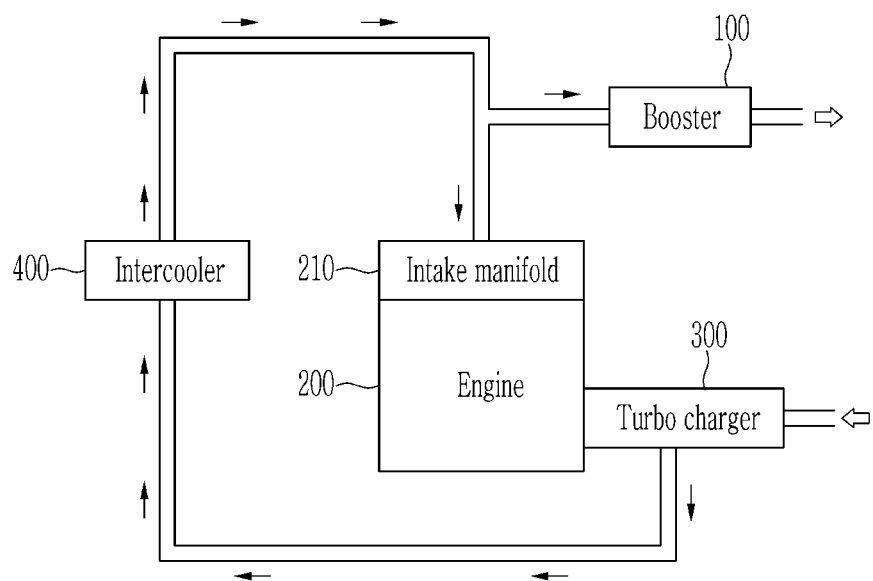
FIG. 2 is a schematic drawing illustrating an operating system of a brake booster to which a brake booster for a vehicle according to an exemplary embodiment of the present invention is applied.
Figure 3:
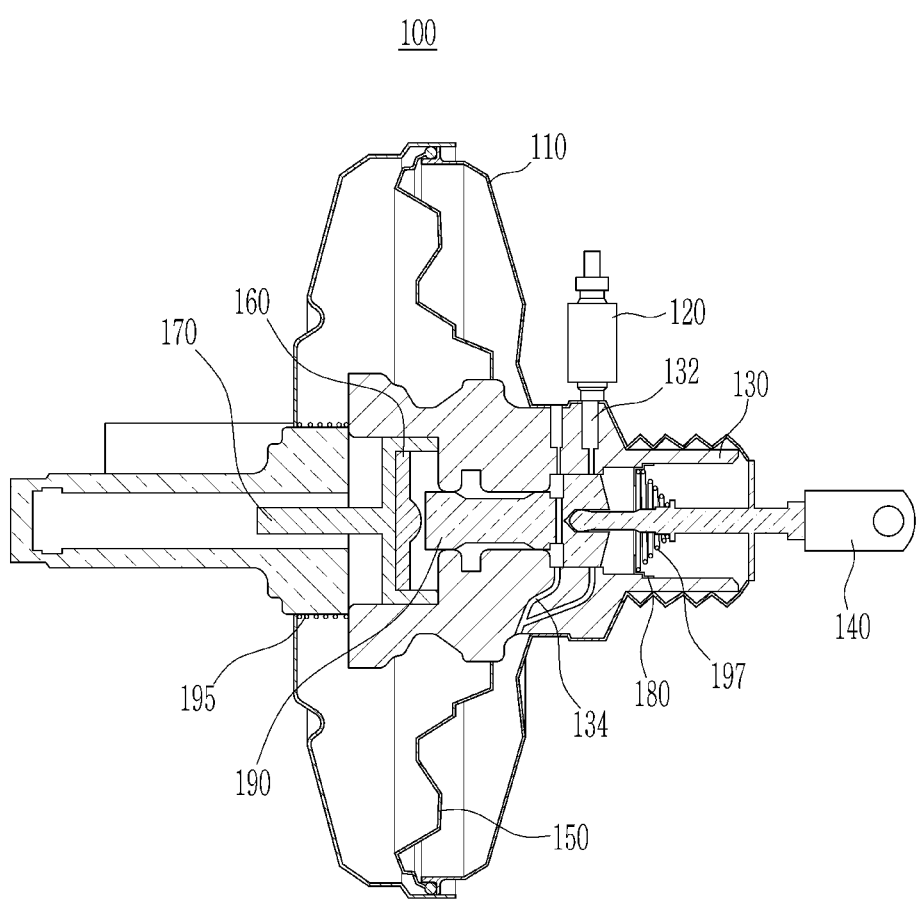
FIG. 3 is a cross-sectional view of a brake booster for a vehicle according to an exemplary embodiment of the present invention.
Figure 4:
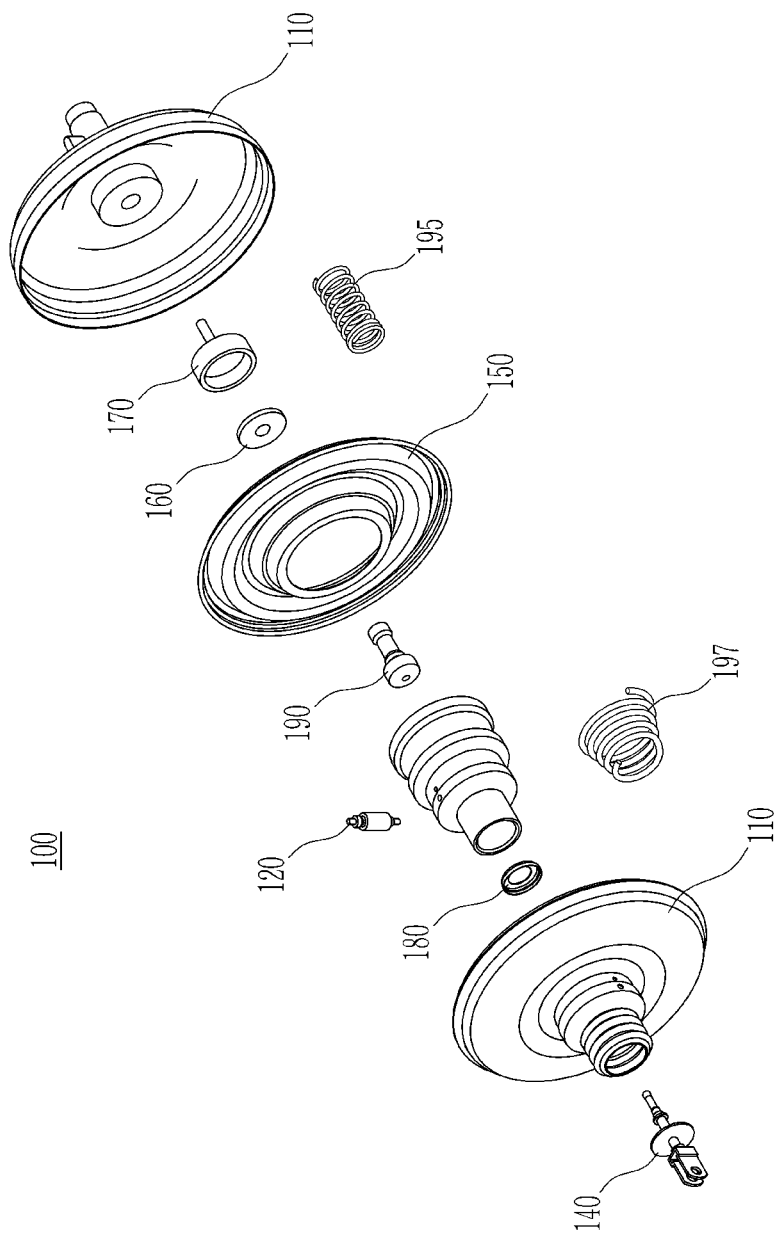
FIG. 4 is a detailed view of a brake booster for a vehicle according to an exemplary embodiment of the present invention.

Hereinafter, a brake booster for a vehicle according to an exemplary embodiment of the present invention will be described in detail with reference to FIG. 2 to FIG. 4. FIG. 2 is a schematic drawing illustrating an operating system of a brake booster to which a brake booster for a vehicle according to an exemplary embodiment of the present invention is applied, FIG. 3 is a cross-sectional view of a brake booster for a vehicle according to an exemplary embodiment of the present invention, and FIG. 4 is a detailed view of a brake booster for a vehicle according to an exemplary embodiment of the present invention.

Referring to FIG. 2, an operating system 500 of a brake booster including a brake booster for a vehicle according to an exemplary embodiment of the present invention may include an engine 200 configured to generate mechanical power by combusting fuel, a turbo charger 300 disposed at the engine 200 and configured to convert air that flows in from atmosphere to high temperature and high pressure air, an intercooler 400 configured to cool the high temperature air supplied from the turbo charger 300 to convert low temperature and high pressure air, and a brake booster 100 configured to amplify braking force of the brake using the low temperature and high pressure air supplied from the intercooler 400.

Low temperature and high pressure air formed at the intercooler 400 flows into an intake manifold 210 of the engine 200, and some of the air flows into the interior of the casing of the brake booster 100. Referring to FIG. 3 and FIG. 4, a brake booster 100 for a vehicle according to an exemplary embodiment of the present invention may include a casing 110, a diaphragm 150, a valve body 130, a check valve 120, an input rod 140, an output rod 170, and an elastic member 195.

The casing 110 may be formed by combination of a front shell and a rear shell, and forms a closed space having a uniform size inside the casing 110. The diaphragm 150 divides an interior portion of the casing 110 into a constant pressure room and a variable pressure room. The constant pressure room may be connected with an intake system, and atmospheric pressure may be constantly applied when the engine 200 starts. High pressure greater than the atmospheric pressure may be applied to the variable pressure room when the brake operates (e.g., is engaged), and the atmospheric pressure may be applied when the brake does not operate (e.g., is disengaged).

Further, an exterior circumference of the diaphragm 150 may be fixed at a connection portion of the front shell and the rear shell, and the center portion of the diaphragm 150 may be fixed at an exterior circumference of the valve body 130 in a sealing state. That is, a center portion of the diaphragm 150 may seal and be combined with a circumference of a front side end of the valve body 130, and a rear side portion of the valve body 130 may be supported by the rear shell. The valve body 130 may include a high pressure air passage 132 that selectively provides high pressure air from the rear portion to the variable pressure room and a bypass passage 134 that selectively provides atmospheric air to the variable pressure room.

The check valve 120 may be connected with the high pressure air passage 132 and may be configured provide high pressure air passed a turbo charger 300 and an intercooler 400 of the operating system 500 of the brake booster to the variable pressure room through the high pressure air passage 132. A front side end of the input rod 140 may be disposed to move to advance and retreat (retract) through an air valve disposed at a center portion of the valve body 130 and a rear side end may be connected with a brake pedal (not illustrated) to operate together with operating of the brake pedal. In other words, the input rod 140 may be configured to move within the valve. An output rod 170 may be connected with a center portion of a front end portion of the valve body 130 by interposing a reaction disk 160, and may be configured to deliver force based on displacement of the air valve 190 and the diaphragm 150 to a master cylinder.

Figure 5A:
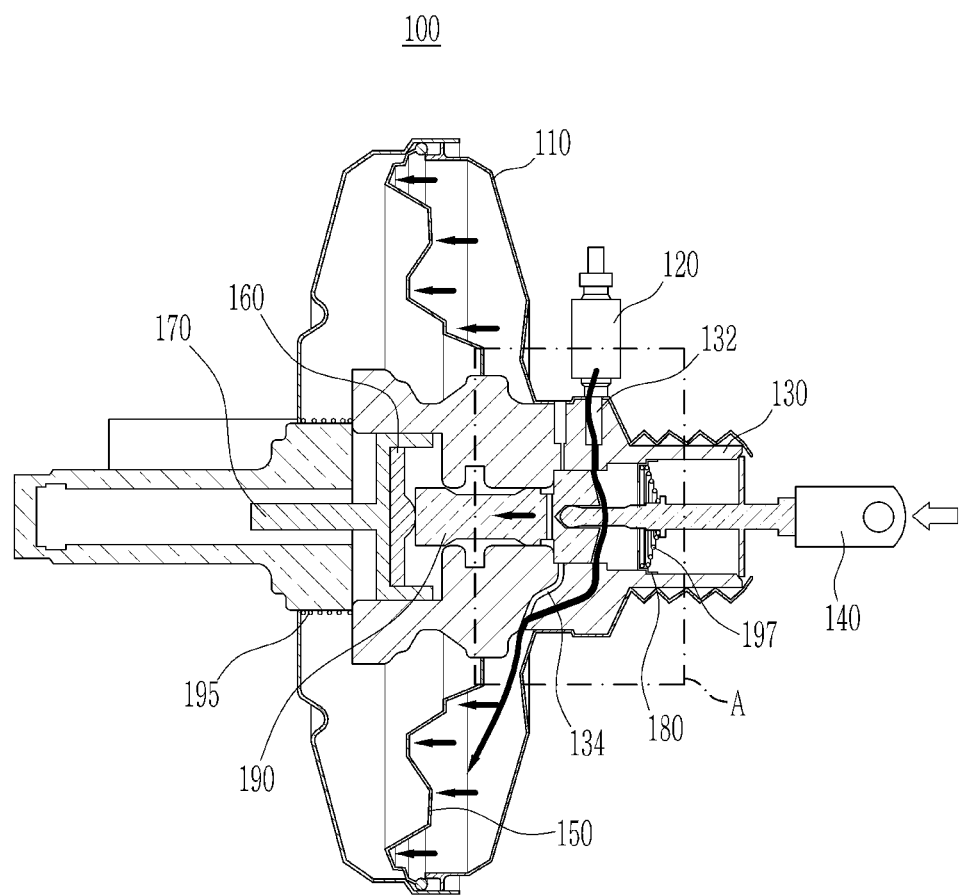
FIG. 5A is a cross-sectional view of flow of high pressure air when a brake of a brake booster of a vehicle according to an exemplary embodiment of the present invention operates.
Figure 5B:
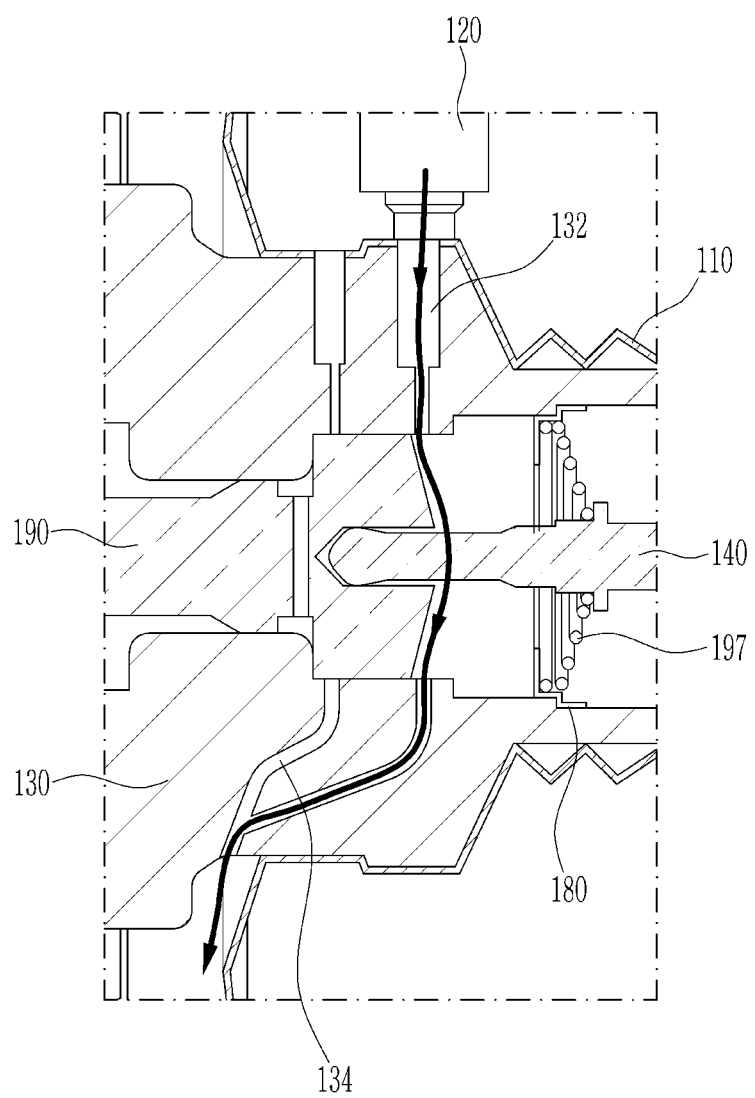
FIG. 5B is a detailed view of 'A' portion of FIG. 5A according to an exemplary embodiment of the present invention.

FIG. 5A is a cross-sectional view of flow of high pressure air when a brake of a brake booster of a vehicle according to an exemplary embodiment of the present invention operates, and FIG. 5B is a detailed view of 'A' portion of FIG. 5A. Referring to FIG. 5A and FIG. 5B, the high pressure air passage 132 may be formed to provide communication between (e.g., to connect) the check valve 120 and the variable pressure room. The high pressure air passage 132 may be opened or closed by the air valve 190 based on movement of advancing and retreating of the input rod 140. That is, the high pressure air passage 132 may be opened or closed based on whether the input rod 140 is advanced (pushed into) in the air valve 190 or retracted out of the valve.

The high pressure air passage 132 may provide communication between the check valve 120 and the variable pressure room when a brake operates, and high pressure air that flows from the check valve 120 may be supplied to the variable pressure room. In other words, when a driver engages the brake pedal, the input rod 140 may advance toward the valve body 130, and the air valve 190 of the valve body 130 may also advance (e.g., move forward or further into/towards). While the air valve 190 advances, the high pressure air passage 132 may be opened to provide communication between the check valve 120 and the variable pressure room. The high pressure air that flows from the check valve 120 may be supplied to the variable pressure room, and the high pressure air supplied to the variable pressure room pushes the diaphragm 150 toward the output rod 170.

Further, the air valve 190 may contact or connect to the reaction disk 160 to push the output rod 170 toward the master cylinder. Pressure applied to the diaphragm 150 by high pressure air supplied to the variable pressure room and pressure applied to the output rod 170 when the air valve 190 contacts with the reaction disk 160 may be added, and therefore sufficient braking force may be generated although a driver operates the brake by minimal force (e.g., engages the brake pedal with minimal force).

Figure 6A:
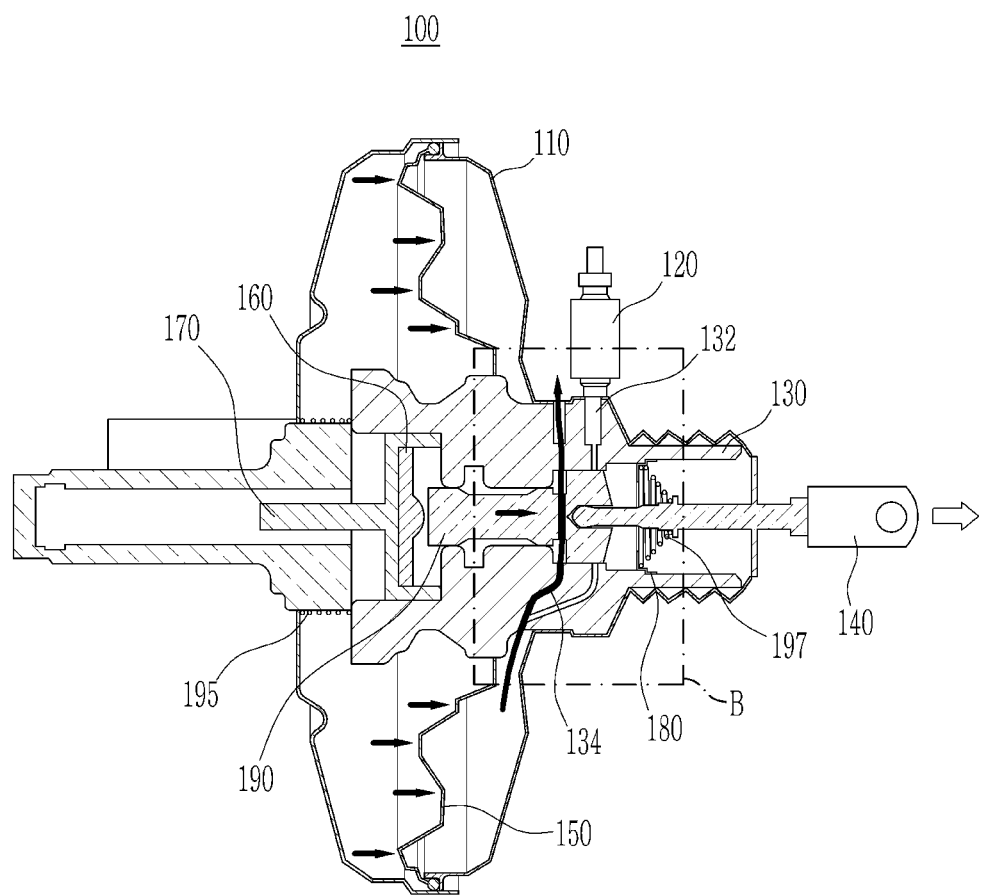
FIG. 6A is a cross-sectional view of flow of high pressure air when a brake of a brake booster for a vehicle according to an exemplary embodiment of the present invention is released.
Figure 6B:
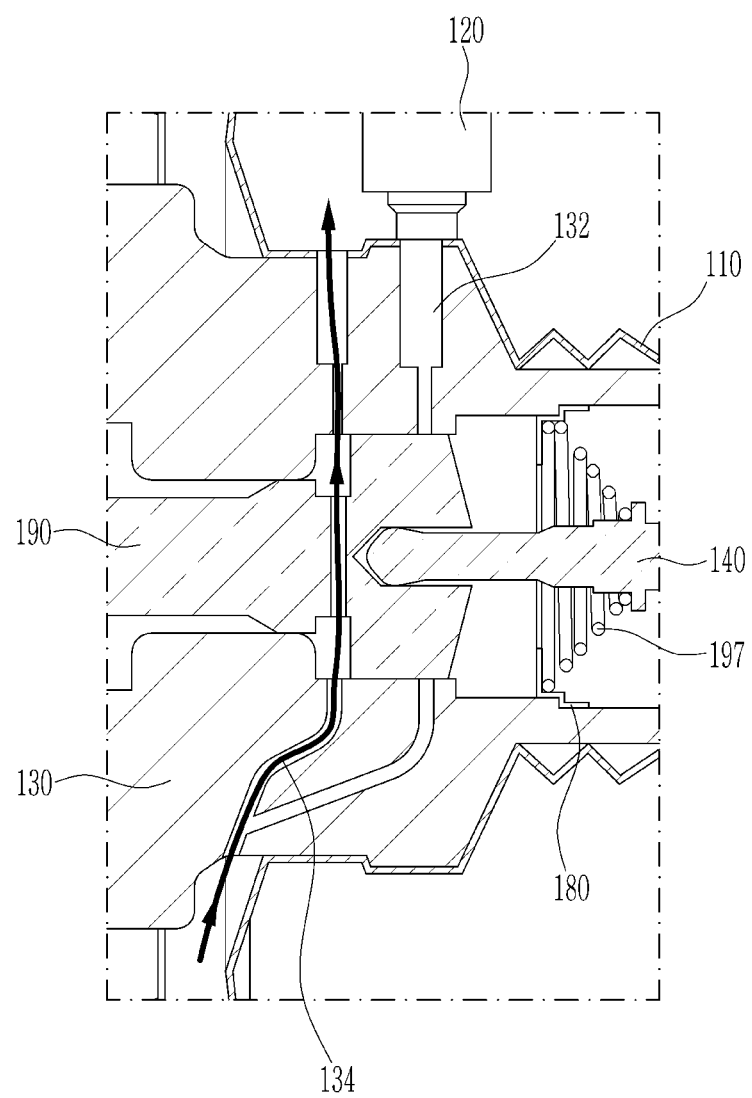
FIG. 6B is a detailed view of 'B' portion of FIG. 6A according to an exemplary embodiment of the present invention.

FIG. 6A is a cross-sectional view of flow of high pressure air when a brake of a brake booster for a vehicle according to an exemplary embodiment of the present invention is released, and FIG. 6B is a detailed view of 'B' portion of FIG. 6A. Referring to FIG. 6A and FIG. 6B, the bypass passage 134 is formed to provide communication with the atmosphere and the variable pressure room. The bypass passage may be opened or closed by the air valve based on movement of advancing and retreating of the input rod 140.

When the brake is disengaged, the high pressure air passage 132 may be closed by the air valve 190, and the variable pressure room and the atmosphere may be in communication with each other. When the brake is released after braking, high pressure air in the variable pressure room may be released toward atmosphere. When the brake is released in a state in which the brake pedal is engaged by the driver and high pressure air is filled in the variable pressure room, the air valve 190 of the valve body 130 may retreat toward the input rod 140. Due to the movement of the air valve 190, the bypass passage 134 and the atmosphere may be connected with each other. Further, high pressure air in the variable pressure room may be released toward atmosphere through the bypass passage 134, and thus, the pressure of the variable pressure room may be balanced with the pressure of atmosphere. When the brake is released, the pressure of the variable pressure room and the pressure of atmosphere is balanced with each other. The diaphragm 150 may then be moved toward the input rod 140 by the elastic member 195 which is interposed between the front shell of the casing 110 and the diaphragm 150 to supply elastic force to the diaphragm 150, and thus, the diaphragm 150 may return to an initial position.

Meanwhile, a spring retainer 180 may be further provided to an interior circumference of a rear side of the valve body 130 at a front side end of the input rod 140. A protrusion may be formed at an exterior circumference of a front side end of the input rod 140, and a return spring 197 may be disposed between the spring retainer 180 and the protrusion. When the brake is released, the return spring 197 may provide elastic force that pushes the input rod 140 toward the brake pedal. In other words, when the brake is released, the return spring 197 pushes the input rod 140 toward the brake pedal, and thus, the air valve 190 may be configured to close the high pressure air passage 132 and open the bypass passage 134.

Figure 7:
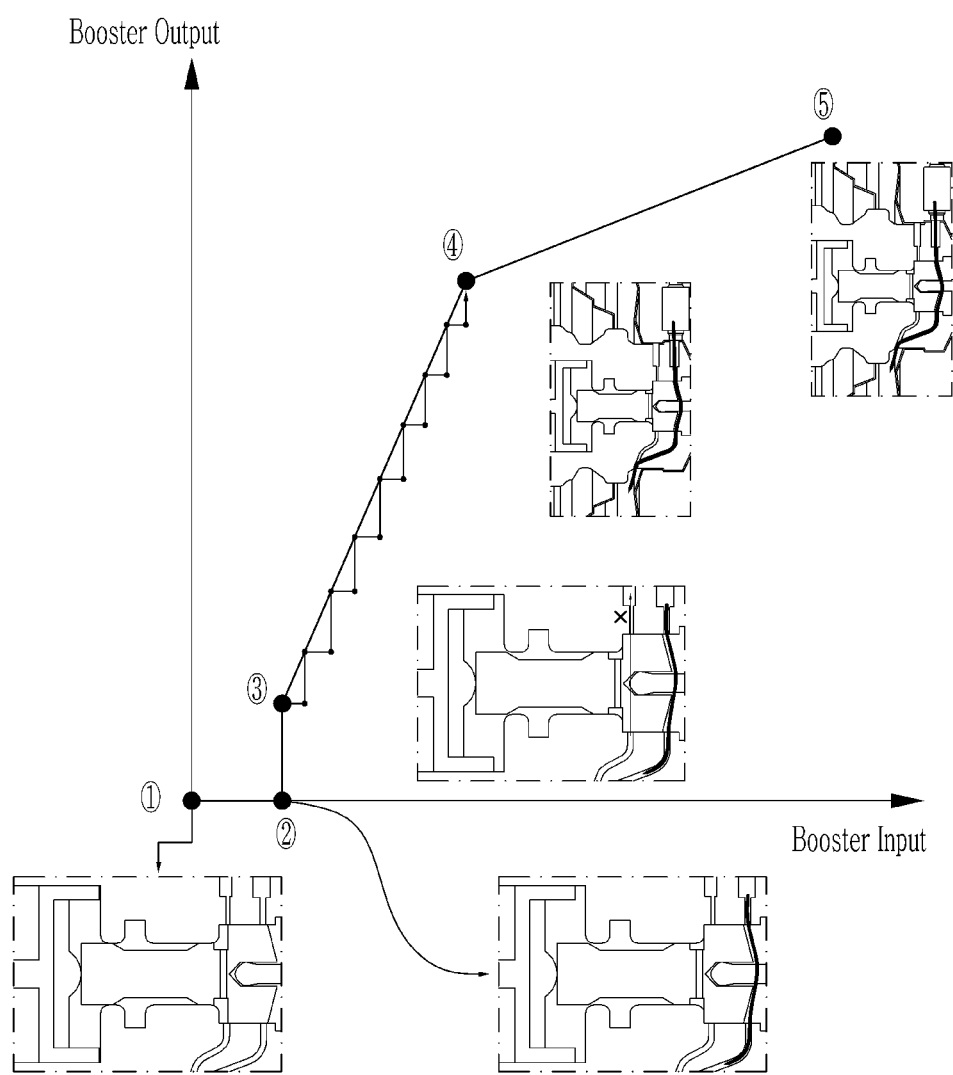
FIG. 7 is a drawing sequentially illustrating states when a brake of a brake booster for a vehicle according to an exemplary embodiment of the present invention operates.

FIG. 7 is a drawing sequentially illustrating states when a brake of a brake booster for a vehicle according to an exemplary embodiment of the present invention operates. Referring to FIG. 7, when the brake pedal is disengaged (e.g., a driver does not exert force onto the pedal), the air valve 190 and the reaction disk 160 re disconnected from each other (e.g., no in contact), and pressure of the variable pressure room and pressure of atmosphere are balanced with each other since the bypass valve 134 is opened (①).

When the driver engages the brake pedal and the input rod 140 and the air valve 190 advance, the air valve 190 and the reaction disk 160 may contact each other. Accordingly, the high pressure air passage 134 may be gradually opened to supply the high pressure air from the check valve 120 to the variable pressure room (②). Then, when the brake pedal is further engaged (e.g., further force is exerted onto the pedal), the input rod 140 and the air valve 190 advance further, the reaction disk 160 together with the air valve 190 pushes the output rod 170 to deliver force to the master cylinder. Further, the bypass passage 134 may be closed completely by the air valve 190 (③).

When the driver further engages the brake pedal, the input rod 140 and the air valve 190 advance further, and thus, the high pressure air passage 132 may be completely opened to deliver maximum force to the master cylinder through the output rod 170 (④). Further, as the brake pedal is consistently engaged, the pressure applied to the master cylinder by the input rod 140 and the output rod 170 is balanced with each other by nearly 1:1 ratio (⑤).

Figure 8:
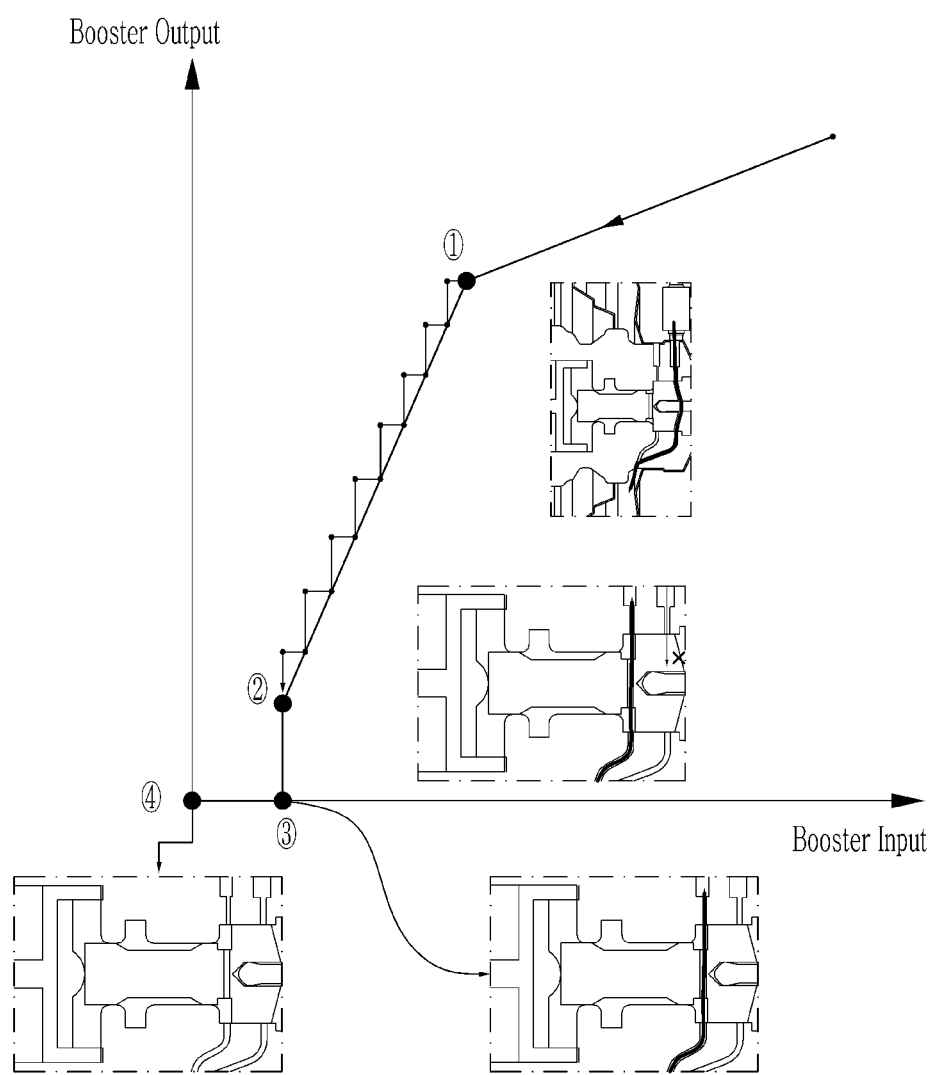
FIG. 8 a drawing sequentially illustrating states when a brake of a brake booster for a vehicle according to an exemplary embodiment of the present invention is released.

FIG. 8 a drawing sequentially illustrating states when a brake of a brake booster for a vehicle according to an exemplary embodiment of the present invention is released. Referring to FIG. 8, maintaining the engagement of the brake pedal, in a state that the pressure applied to the master cylinder by the input rod 140 and the output rod 170 is balanced with each other, when the driver slowly or gradually disengages the brake pedal, the input rod 140 and the air valve 190 gradually retreat. Accordingly, high pressure air may be supplied to the variable pressure room through the check valve 120 when the high pressure air passage 132 is completely opened (①).

Further, when the driver further disengages the brake pedal, the input rod 140 and the air valve 190 retreat further, and the bypass passage 134 may be gradually opened and the high pressure air passage 132 may be gradually closed (②). When the driver continues disengaging the brake pedal, the input rod 140 and the air valve 190 retreat further, and the high pressure air passage 132 may be completely closed and the bypass passage 134 may be completely opened, therefore pressure of the variable pressure room becomes balanced with the pressure of the atmosphere (③). When the brake is completely released or disengaged, contact of the air valve 190 with the reaction disk is completely released to return the initial state (④).

Similarly, according to an exemplary embodiment of the present invention, separate devices as a conventional vacuum pump and a hose etc. for forming vacuum may be omitted to simplify the interior structure of the brake booster. Accordingly, productivity of the brake booster manufacturing may be increased and manufacturing costs may be reduced. In addition, weight of the vehicle may be reduced by the simplified structure using the difference between high pressure of compressed air passed through a turbo charger and an intercooler of a vehicle and atmospheric pressure.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A brake booster for a vehicle, comprising:
a casing formed by combination of a front shell and a rear shell;
a diaphragm that divides an interior portion of the casing into a constant pressure room and a variable pressure room;
a valve body sealed by a circumference of a front side end and combined with a center portion of the diaphragm and a rear portion that penetrates the rear shell, and having a high pressure air passage that selectively provides high pressure air from the rear portion to the variable pressure room and a bypass passage that selectively provides atmospheric air to the variable pressure room;
a check valve connected with the high pressure air passage and configured to provide high pressure air passed a turbo charger and an intercooler to the variable pressure room through the high pressure air passage;
an input rod of which a front side end is disposed to move to advance and retreat through an air valve disposed at a center portion of the valve body and a rear side end connected with a brake pedal;
an output rod connected with a center portion of a front end portion of the valve body by interposing a reaction disk, and configured to deliver force based on displacement of the air valve and the diaphragm to a master cylinder; and an elastic member interposed between the front shell and the diaphragm to provide elastic force to the diaphragm, wherein the bypass passage is formed to provide communication between atmosphere and the variable pressure room, wherein the bypass passage is opened or closed by the air valve based on movement of advancing and retreating of the input rod, and wherein the bypass passage provides communication between the variable pressure room and the atmosphere when the brake is released, and high pressure air in the variable pressure room is released to the atmosphere.

2. The brake booster for a vehicle of claim 1, wherein the high pressure air passage is formed to provide communication between the check valve and the variable pressure room.

3. The brake booster for a vehicle of claim 2, wherein the high pressure air passage is opened or closed by the air valve based on movement of advancing and retreating of the input rod.

4. The brake booster for a vehicle of claim 3, wherein the high pressure air passage provides communication between the check valve and the variable pressure room when a brake operates, and high pressure air that flows from the check valve is supplied to the variable pressure room.

5. The brake booster for a vehicle of claim 4, wherein the high pressure air passage provides communication between the check valve and the variable pressure room since the input rod and the air valve move toward the front shell when the brake operates.

6. The brake booster for a vehicle of claim 1, wherein the bypass passage provides communication between the atmosphere and the variable pressure room since the input rod and the air valve move toward the brake pedal when the brake is released.

7. The brake booster for a vehicle of claim 1, wherein a spring retainer is provided to an interior circumference of a rear side of the valve body at a front side end of the input rod, and a return spring is disposed between the spring retainer and a protrusion formed at an exterior circumference of a front side end of the input rod to provide elastic force that pushes the input rod toward the brake pedal.

8. The brake booster for a vehicle of claim 7, wherein when the brake is released, the air valve closes the high pressure air passage and opens the bypass passage since the return spring pushes the input rod toward the brake pedal.

* * * * *